C. L. McDONALD.
STRAW SPREADER AND GRAIN SEPARATOR.
APPLICATION FILED JUNE 5, 1917.
1,264,409.
Patented Apr. 30, 1918.
3 SHEETS—SHEET 1.
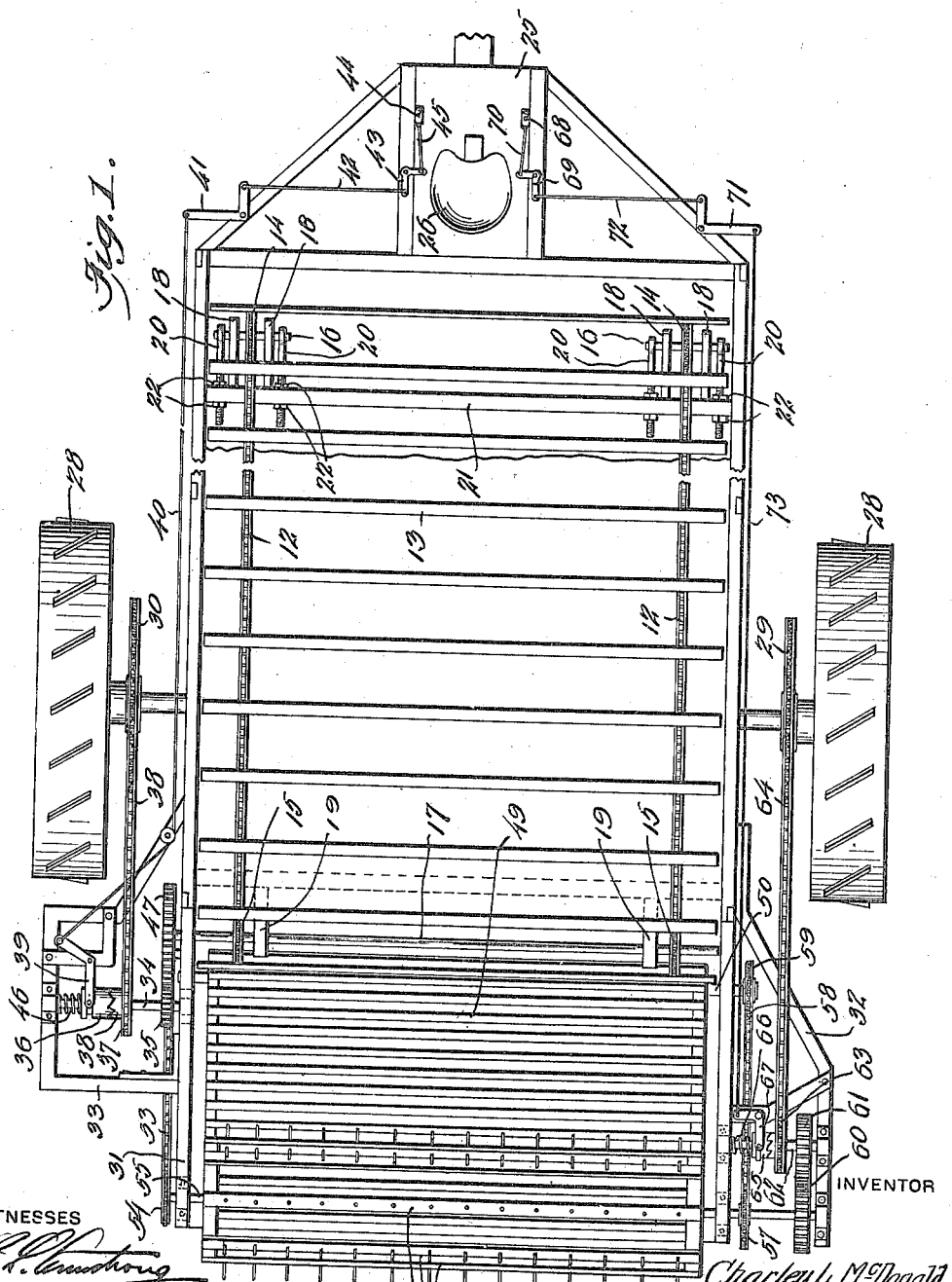

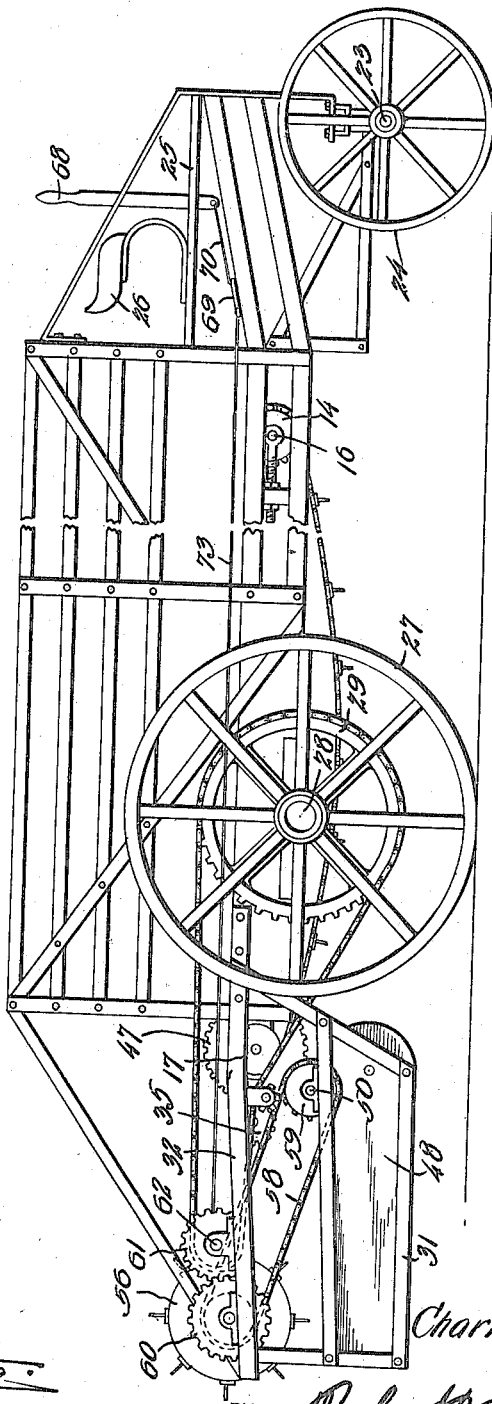

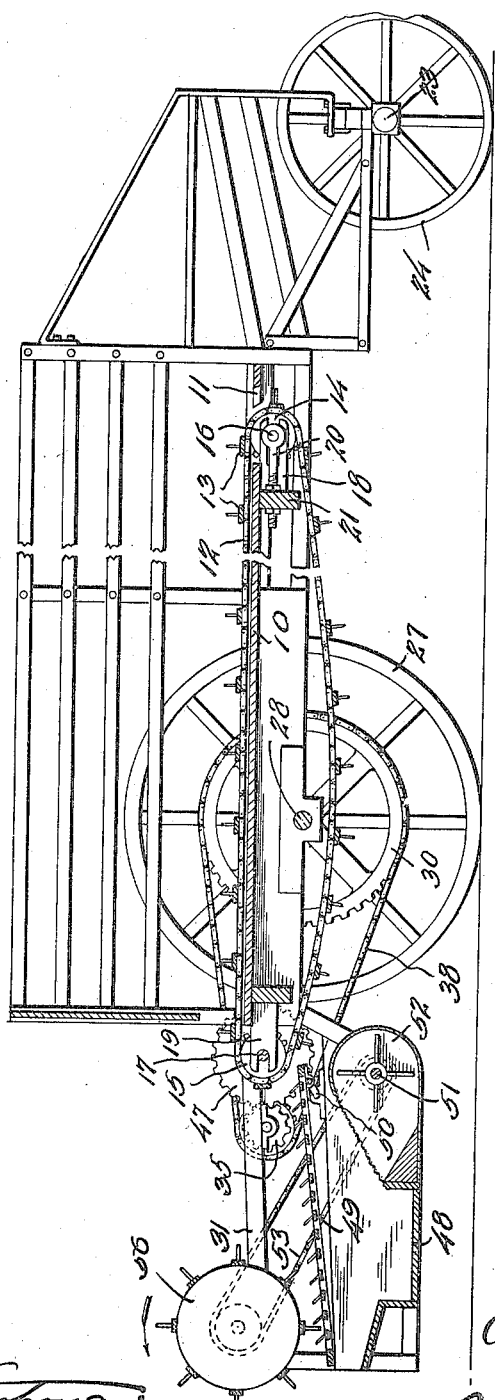

UNITED STATES PATENT OFFICE.

CHARLEY L. McDONALD, OF MULLINVILLE, KANSAS.

STRAW-SPREADER AND GRAIN-SEPARATOR.

1,264,409.   Specification of Letters Patent.   Patented Apr. 30, 1918.

Application filed June 5, 1917. Serial No. 172,980.

*To all whom it may concern:*

Be it known that I, CHARLEY L. McDONALD, a citizen of the United States, residing at Mullinville, in the county of Kiowa and State of Kansas, have invented certain new and useful Improvements in Straw-Spreaders and Grain-Separators, of which the following is a specification.

This invention relates to an improved straw spreader and grain separator and the principal object of the invention is to provide a vehicle in which straw may be placed and spread upon a field as the vehicle is drawn across the field, improved means being provided for feeding the straw out of the vehicle and improved means being provided for separating grain from the straw as it is fed upon the field, a fan being also associated with the grain separating portion of the machine so that the grain will be cleaned of small pieces of straw and other light material which might pass through the screen with the grain.

Another object of the invention is to so construct this device that the vehicle portion may resemble a conventional form of farm wagon and thus the spreader attachment permitted to be sold separate and connected with wagon already in use.

Another object of the invention is to provide a spreader which will feed the straw evenly and cause the straw to be fed over the grain separator thus permitting the grain contained in the straw to be shaken loose from the straw and drop into the grain box positioned beneath the separator or screen.

This invention is illustrated in the accompanying drawings, wherein:—

Figure 1 is a view showing the improved straw spreader and grain separator in top plan.

Fig. 2 is a side elevation of the improved straw spreader and grain separator, and Fig. 3 is a longitudinal sectional view through the improved straw spreader and grain separator.

The vehicle is provided with a body having a flooring 10 provided adjacent its forward end with a transversely extending opening 11 through which will pass the endless conveyer formed of the sprocket chains 12 and cross bars 13. These sprocket chains pass about the forward and rear sprocket wheels 14 and 15 mounted upon the shafts 16 and 17. The forward shafts 16 pass through bearing arms or brackets 18 similar to the bearing arms or brackets 19 of the rear shafts and have their end portions engaged by the eye bolts 20 adjustably secured in the cross beam 21 beneath the flooring 10 by securing nuts 22. By means of this construction, the sprocket wheels may be moved longitudinally of the vehicle and the endless conveyer tightened to the proper amount. This vehicle is provided with a forward truck carrying the axle 23 for the forward wheels 24 and is further provided with a driver's platform 25 upon which is mounted the driver's seat 26. The rear wheels 27 are mounted upon the rear axle 28 and it will be readily seen that when this vehicle is drawn across the field, the sprocket wheels 29 and 30 will be rotated thus providing the necessary driving power.

To the rear of the body of this vehicle there has been provided a frame indicated in general by the numeral 31. Brackets 32 and 33 extend at the sides of this frame 31 and are connected with the body of the vehicle as shown in Figs. 1 and 2. A shaft 34 is rotatably mounted between the brackets 33 and the side of the frame 31 and carries a gear 35, a clutch 36 and a sprocket wheel 37. A sprocket chain 38 passes around the sprocket wheel 30 and the sprocket wheel 37 thus rotating this sprocket wheel 37 and when the clutch 36 is in engagement with the clutch 38 of the sprocket 37, the shaft 34 will be rotated. In order to move the clutch 36 out of engagement with the clutch 38, when desired, there has been provided a bell crank lever 39 engaged by a line 40 led forwardly and connected with the bell crank lever 41 from which leads a rod 42 which in its turn is connected with a bell crank lever 43. This bell crank lever 43 is connected with the actuating lever 44 by a rod or link 45 and it will be readily seen that by means of this lever, the clutch 36 may be very easily swung to an inoperative position against the tension of its spring 46. Under normal conditions, the clutch 36 will be held in engagement with the clutch 38 and rotary movement will be transmitted through shaft 34 and through the medium of the intermeshing gears 35 and 47 to the shaft 17 carrying sprockets 15. The endless conveyer would then move longitudinally of the vehicle body and carry straw in the body out through the rear end thereof.

A grain box 48 is carried by this frame 31 and above the grain box there is provided a shaker board or screen 49 provided with spaced slats and having its rear end portion connected with the rocker shaft 50. As this rocker shaft rotates, the shaker board will be moved and agitated thus causing grain to pass between the slats of the screen or shaker board and drop into the grain box. A fan 51 is mounted in the fan housing 52 and the blast from the fan will pass through the grain falling through the shaker board thus carrying away small pieces of straw and other trash which may pass through the board with the grain. In order to drive this fan, a sprocket wheel is mounted upon the outer end of the fan shaft and is engaged by a sprocket chain 53 which chain passes about a sprocket wheel 54 mounted upon the shaft 55 of the cylinder 56. This cylinder 56 extends transversely of the fan 51 above the screen or shaker board 49 and the straw will be fed onto the field by this cylinder. Upon the opposite end portion of the shaft 55 there is provided a sprocket wheel 57 about which passes a sprocket chain 58 for transmitting rotary motion to the crank shaft 50 through the medium of the sprocket wheel 59. A gear 60 is carried by shaft 55 and meshes with a gear 61 mounted upon the short shaft 62 rotatably mounted between the side brackets 32 and the frame 31. A sprocket wheel 63 is mounted upon the shaft 62 and rotated through the medium of the sprocket chain 64 and it will thus be seen that when the clutch 65 is in engagement with the clutch of the sprocket 63, the cylinder 56 will be rotated and the rocker shaft 50 rotated. This clutch 65 is normally held in an operative position by the spring 66 and is engaged by the bell crank lever 67 which when moved will throw the clutch out of engagement with the clutch of the sprocket. In order to move this clutch to an inoperative position, there is provided a lever 68 which lever is connected with a bell crank lever 69 by the rod or link 70, the bell crank lever being connected with a bell crank lever 71 through the medium of the rod 72 and the bell crank lever 71 being in its turn connected with the bell crank lever 67 by the rod or connection 73.

From the above description it will be readily seen that when in use, the straw will be placed in the vehicle body and this vehicle then driven across a field. As this machine moves across a field, the straw will be moved out through the rear of the vehicle by the endless conveyer and will drop upon the shaker board or screen 49. As this screen moves, the straw will be worked toward the rear end thereof and any grain in the straw will pass through the slats and down into the grain box. The straw will be engaged by the teeth of the cylinder 56 and will be thrown upon the field. The air from the fan will pass through the grain and through the straw and will serve to thoroughly clean the grain. I have therefore provided a device for spreading straw upon a field and at the same time removing any grain in the straw thus causing a saving of grain which otherwise would be wasted. I have thus provided a very efficient machine for the purpose specified and have further provided one which will be easy to operate and in which the operating mechanism can be thrown out of operation when desired.

What is claimed is:—

1. The combination with a vehicle, of a frame supported by the vehicle, a conveyer movable through the vehicle, means for driving the said conveyer from one of the supporting wheels of the vehicle, a shaker platform movably mounted in the said frame, feeding means rotatably mounted above the shaker platform, driving means for transmitting motion to the said feeding means from a second supporting wheel of the vehicle, and actuating means for the said shaker platform.

2. The combination with a vehicle, of a frame supported by the vehicle, a conveyer including a forwardly and a rearwardly moving portion, the uppermost portion being movable through the said vehicle, means for driving the said conveyer from one of the said supporting wheels of the vehicle, a shaker platform movably mounted in the frame, a cylinder rotatably mounted above the said platform for feeding the material from the platform, means connected to the said cylinder for imparting a rotary movement thereto, the said last mentioned means being connected to a second supporting wheel of the vehicle, and means for transmitting rotary movement from the said cylinder to the said platform.

3. The combination with a vehicle having means for feeding material from the rear end thereof of a frame connected with the rear end portion of the vehicle, a crank shaft rotatably connected with the frame, a shaker platform movably mounted in the frame and engaged by the crank shaft for reciprocating movement when the crank shaft rotates, a roller rotatably mounted above the platform for feeding material from the platform onto the ground, and means for actuating the roller and crank shaft.

4. The combination with a vehicle of a frame positioned to the rear of the vehicle, an endless conveyer having its upper flight moving through the vehicle and including a driven shaft positioned adjacent the rear end of the vehicle, means for transmitting rotary movement from one of the supporting wheels of the vehicle to the driven shaft of the endless conveyer, a shaker platform movably carried by the frame, a crank shaft for the platform rotatably connected with the frame, a feeding roller rotatably mounted above the platform and having a shaft rotatably mounted upon the frame, means for transmitting rotary movement from a second supporting wheel of the vehicle to the shaft of the feeding roller, and means for transmitting rotary movement from the shaft of the feeding roller to the actuating shaft of the platform.

In testimony whereof I affix my signature in presence of two witnesses.

CHARLEY L. McDONALD.

Witnesses:
D. B. PEDIGO,
J. D. BLOCHER.

Copies of this patent may be obtained for five cents each, by addressing the "Commissioner of Patents, Washington, D. C."